(12) United States Patent
Unno

(10) Patent No.: US 10,618,175 B2
(45) Date of Patent: Apr. 14, 2020

(54) VIBRATION MEASUREMENT METHOD FOR MOVING PART, VIBRATION MEASUREMENT METHOD FOR ROBOT, AND CONTROL DEVICE

(71) Applicant: Seiko Epson Corporation, Tokyo (JP)

(72) Inventor: Yukihiro Unno, Matsumoto (JP)

(73) Assignee: Seiko Epson Corporation (JP)

( * ) Notice: Subject to any disclaimer, the term of this patent is extended or adjusted under 35 U.S.C. 154(b) by 103 days.

(21) Appl. No.: 15/490,044

(22) Filed: Apr. 18, 2017

(65) Prior Publication Data

US 2017/0312922 A1   Nov. 2, 2017

(30) Foreign Application Priority Data

Apr. 28, 2016 (JP) ................. 2016-090390

(51) Int. Cl.
*G06F 19/00* (2018.01)
*B25J 9/16* (2006.01)

(52) U.S. Cl.
CPC .......... *B25J 9/1694* (2013.01); *B25J 9/1651* (2013.01); *G05B 2219/37388* (2013.01); *G05B 2219/37435* (2013.01); *G05B 2219/40459* (2013.01)

(58) Field of Classification Search
CPC ............... B25J 9/1694; B25J 9/1651; G05B 2219/37388; G05B 2219/37435; G05B 2219/40459
USPC ................................................ 700/245, 258
See application file for complete search history.

(56) References Cited

U.S. PATENT DOCUMENTS

| | | | | |
|---|---|---|---|---|
| 5,056,038 | A | * | 10/1991 | Kuno ............. B25J 9/1633 700/260 |
| 8,588,977 | B2 | * | 11/2013 | Engeberg ............. A61F 2/583 700/245 |
| 8,833,603 | B1 | * | 9/2014 | Balasubramanian ................... G07F 17/0092 221/200 |
| 9,327,402 | B2 | | 5/2016 | Niu |
| 9,427,873 | B2 | | 8/2016 | Kirihara |
| 9,475,180 | B2 | * | 10/2016 | Eshleman ............. B25B 21/004 |
| 10,105,149 | B2 | * | 10/2018 | Haider ................ A61B 17/17 |
| 2001/0045128 | A1 | * | 11/2001 | McCall ................ G01C 21/16 73/511 |
| 2005/0126833 | A1 | * | 6/2005 | Takenaka ............ B25J 13/088 180/8.1 |

(Continued)

FOREIGN PATENT DOCUMENTS

| | | |
|---|---|---|
| JP | 04-025386 A | 1/1992 |
| JP | 2012-232370 A | 11/2012 |

(Continued)

*Primary Examiner* — Ronnie M Mancho
(74) *Attorney, Agent, or Firm* — Harness, Dickey & Pierce, P.L.C.

(57) ABSTRACT

A vibration measurement method for a moving part is a vibration measurement method in which vibration of a moving part is measured using a first inertial sensor. The method includes: performing measurement by the first inertial sensor in a state where the moving part is resonating, driven by a drive unit which drives the moving part; and finding a magnitude of vibration of the moving part, based on an output from the first inertial sensor. An example of the moving part may be a plurality of arms or the like provided in such a way as to be able to rotate about a rotation axis.

20 Claims, 8 Drawing Sheets

(56) References Cited

U.S. PATENT DOCUMENTS

| | | | | |
|---|---|---|---|---|
| 2006/0265120 | A1* | 11/2006 | Coleman | G01C 21/18 |
| | | | | 702/153 |
| 2011/0043515 | A1* | 2/2011 | Stathis | G01C 15/002 |
| | | | | 345/419 |
| 2012/0053726 | A1* | 3/2012 | Peters | E04G 21/22 |
| | | | | 700/252 |
| 2012/0065902 | A1* | 3/2012 | Nakajima | B25J 13/085 |
| | | | | 702/41 |
| 2012/0232780 | A1* | 9/2012 | Delson | A63F 13/06 |
| | | | | 701/400 |
| 2013/0190926 | A1* | 7/2013 | Motoyoshi | B25J 9/1653 |
| | | | | 700/254 |
| 2015/0081110 | A1* | 3/2015 | Houston | G05D 19/02 |
| | | | | 700/280 |
| 2015/0120050 | A1* | 4/2015 | Gomi | B25J 9/1682 |
| | | | | 700/258 |
| 2015/0266185 | A1 | 9/2015 | Sekine | |
| 2015/0306765 | A1* | 10/2015 | Motoyoshi | B25J 9/1694 |
| | | | | 700/258 |
| 2016/0258758 | A1* | 9/2016 | Houston | G01C 21/20 |

FOREIGN PATENT DOCUMENTS

| | | |
|---|---|---|
| JP | 2014-127533 A | 7/2014 |
| JP | 2014-205198 A | 10/2014 |
| JP | 2015-182143 A | 10/2015 |

* cited by examiner

VIBRATION MEASUREMENT METHOD FOR MOVING PART, VIBRATION MEASUREMENT METHOD FOR ROBOT, AND CONTROL DEVICE

BACKGROUND

1. Technical Field

The present invention relates to a vibration measurement method for a moving part, a vibration measurement method for a robot, and a control device.

2. Related Art

A robot having a base and a manipulator with a plurality of arms (links) is known. One of two neighboring arms of the manipulator is connected to the other arm via a joint part in such away as to be able to rotate. The arm closest to the proximal end (most upstream) is connected to the base via a joint part in such a way as to be able to rotate. The joint parts are driven by a motor. As the joint parts are driven, the arms rotate. On the arm closest to the distal end (most downstream), for example, a hand is removably attached as an end effector. The robot grips an object with the hand, moves the object to a predetermined place, and carries out predetermined work such as assembling, for example.

JP-A-2014-205198 discloses a robot control device which reduces the vibration of an arm, using difference information between an output from an angular velocity sensor provided in a robot and an output from an encoder.

As a method for measuring the magnitude of vibration of a moving part of a robot or the like, a method in which a person checks the state of vibration of the moving part, visually or by placing a hand on the moving part, is employed.

However, the robot control device disclosed in JP-A-2014-205198 does not quantitatively measure the magnitude of vibration of a moving part of a robot or the like, using an inertial sensor such as an angular velocity sensor. The robot control device does not determine whether the vibration of the moving part is acceptable or not, based on the measured magnitude of vibration of the moving part, either.

With the related-art method for measuring the magnitude of vibration of a moving part of a robot or the like, the magnitude of vibration of the moving part cannot be quantitatively grasped, and the determination on this varies from one person to another. Therefore, it is difficult to determine whether the vibration of the moving part is acceptable or not, based on a predetermined standard. It is also difficult to quantitatively grasp the difference in magnitude of vibration between a plurality of moving parts.

SUMMARY

An advantage of some aspects of the invention is to solve at least a part of the problems described above, and the invention can be implemented as the following configurations or application examples.

A vibration measurement method according to an aspect of the invention is a vibration measurement method for a moving part is a vibration measurement method in which vibration of a moving part is measured using a first inertial sensor. The method includes: performing measurement by the first inertial sensor in a state where the moving part is resonating, driven by a drive unit which drives the moving part; and finding a magnitude of vibration of the moving part, based on an output from the first inertial sensor.

With this configuration, the magnitude of vibration of the moving part can be quantitatively measured in the state where the moving part is resonating.

In the vibration measurement method for the moving part, it is preferable that the moving part has a plurality of arms provided in such a way as to be able to rotate about a rotation axis, and that when moving a distal end of the moving part from a first position to a second position, measurement is carried out by the first inertial sensor in a state where at least two arms of the plurality of arms are made to rotate and resonate by the drive unit.

With this configuration, the magnitude of vibration of the arms can be quantitatively measured in the state where the arms are resonating.

Also, since the natural frequency of vibration of the moving part changes while the distal end of the moving part is moved from the first position to the second position, it can be expected that the frequency of vibration of the moving part and the natural frequency of vibration of the moving part coincides with each other, causing the moving part to resonate.

Moreover, the magnitude of vibration can be measured simultaneously for two arms.

In the vibration measurement method for the moving part, it is preferable that the rotation axes of the two arms are parallel to each other.

With this configuration, the distal end of the moving part can be maintained in the same attitude while the distal end of the moving part is moved from the first position to the second position.

In the vibration measurement method for the moving part, it is preferable that the distal end of the moving part is maintained in a same attitude while the distal end of the moving part is moved from the first position to the second position.

With this configuration, measurement can be carried out in the state where a target value of angular velocity of the distal end of the moving part is 0. Therefore, the magnitude of vibration of the moving part can be easily measured quantitatively in the state where the moving part is resonating.

In the vibration measurement method for the moving part, it is preferable that the moving part is driven at a plurality of difference velocities and that measurement is carried out by the first inertial sensor at each velocity.

With this configuration, it can be expected that the moving part resonates at one of the plurality of velocities.

Also, the vibration of the moving part can be restrained by selecting a velocity corresponding to the lowest magnitude of vibration, of the magnitudes of vibration of the moving part found with the respective velocities.

In the vibration measurement method for the moving part, it is preferable that the first inertial sensor is installed inside the moving part.

With this configuration, the first inertial sensor can be used for other purposes such as vibration control of the moving part, for example.

In the vibration measurement method for the moving part, it is preferable that a second inertial sensor that is different from the first inertial sensor is provided in a support part supporting the moving part, that measurement is carried out by the second inertial sensor in a state where the moving part is driven by the drive unit, and that a magnitude of vibration of the support part is found, based on an output from the second inertial sensor.

With this configuration, the influence of the vibration of moving part can be reduced, using a method of changing not only the moving speed of the moving part but also the natural frequency of vibration of the support part or the like, for example.

In the vibration measurement method for the moving part, it is preferable that the first inertial sensor is a 6-axis inertial sensor.

With this configuration, acceleration in each of three axial directions orthogonal to each other and angular velocity about each of the three axes can be measured by the 6-axis inertial sensor, and the magnitude of vibration of the moving part can be found, based on an output from the 6-axis inertial sensor. Using the 6-axis inertial sensor is advantageous in that a large amount of information can be obtained and that measurement by an angular velocity sensor is less susceptible to the influence of gravity and centrifugal force.

In the vibration measurement method for the moving part, it is preferable that the first inertial sensor is an angular velocity sensor.

With this configuration, angular velocity can be measured by the angular velocity sensor and the magnitude of vibration of the moving part can be found, based on an output from the angular velocity sensor. Using the angular velocity sensor is advantageous in that measurement is less susceptible to the influence of gravity and centrifugal force.

A vibration measurement method for a robot according to another aspect of the invention is a vibration measurement method in which vibration of a robot is measured using an inertial sensor. The method includes: performing measurement by the inertial sensor in a state where the robot is resonating, driven by a drive unit which drives the robot; and finding a magnitude of vibration of the robot, based on an output from the inertial sensor.

With this configuration, the magnitude of vibration of the robot can be quantitatively measured in the state where the robot is resonating.

A control device according to still another aspect of the invention is a control device which controls a robot with an arm, and includes: a computing unit which finds a magnitude of vibration of the arm, based on an output from an inertial sensor provided in the arm, in a state where the arm is resonating.

With this configuration, the magnitude of vibration of the arm can be quantitatively found in the state here the arm is resonating.

It is preferable that the control device includes a selection unit which causes the arm to move at a plurality of different velocities and selects a velocity corresponding to the lowest magnitude of vibration, of the magnitudes of vibration of the arm found by the computing unit with the respective velocities.

With this configuration, the vibration of the arm can be restrained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
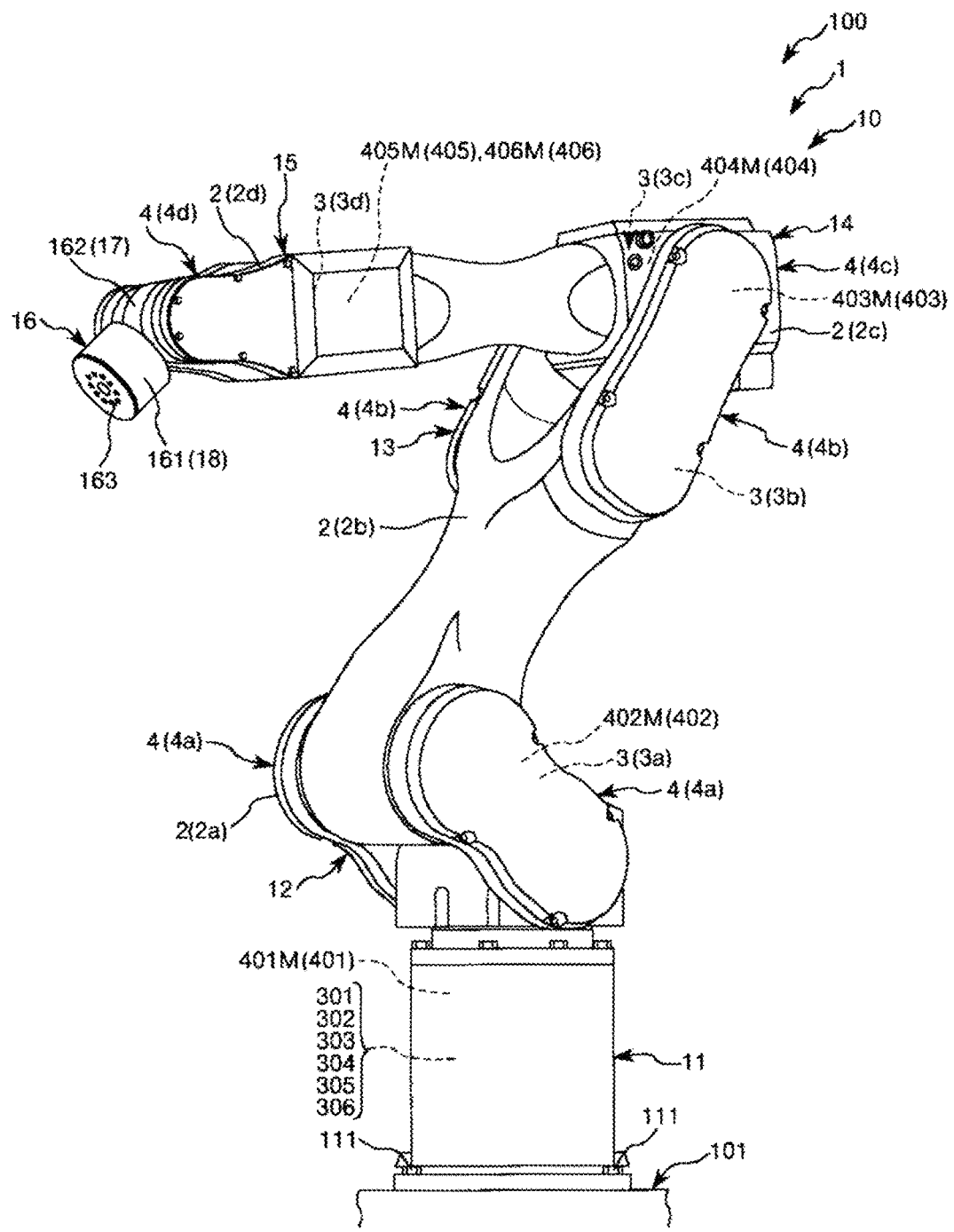
FIG. 1 is a perspective view showing a robot controlled by a control device according to a first embodiment of the invention, as viewed from the front.

Hereinafter, a vibration measurement method for a moving part, a vibration measurement method for a robot and a control device according to the invention will be described in detail, referring to embodiments illustrated in the drawings.

The type, configuration and the like of a moving part as an object for vibration measurement are not particularly limited, provided that the moving part is movable. However, in the embodiments below, an example in which the moving part is a manipulator of a robot is employed. Therefore, a vibration measurement method for a manipulator (robot), which is a subordinate concept of a vibration measurement method for a moving part, will be described.

First Embodiment

Figure 2:
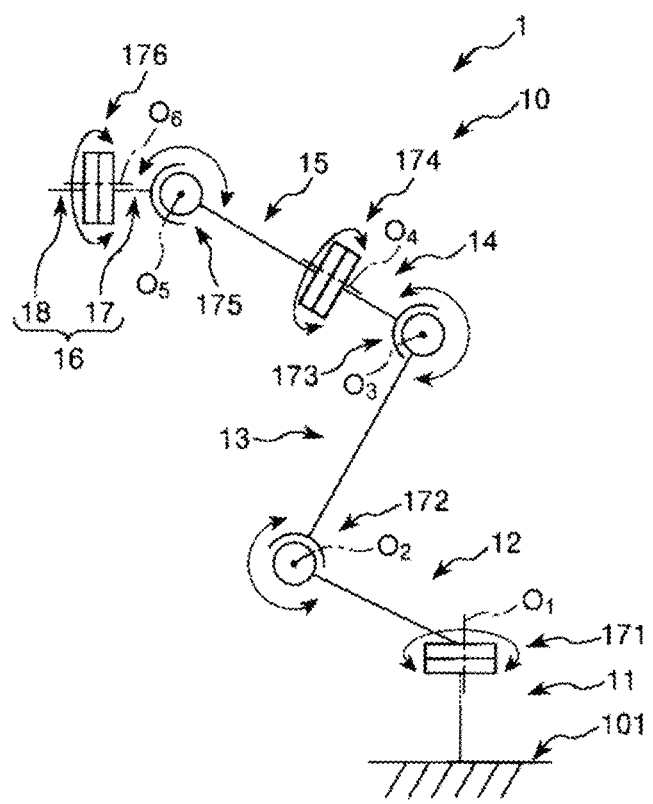
FIG. 2 is a schematic view showing the robot shown in FIG. 1.
Figure 3:
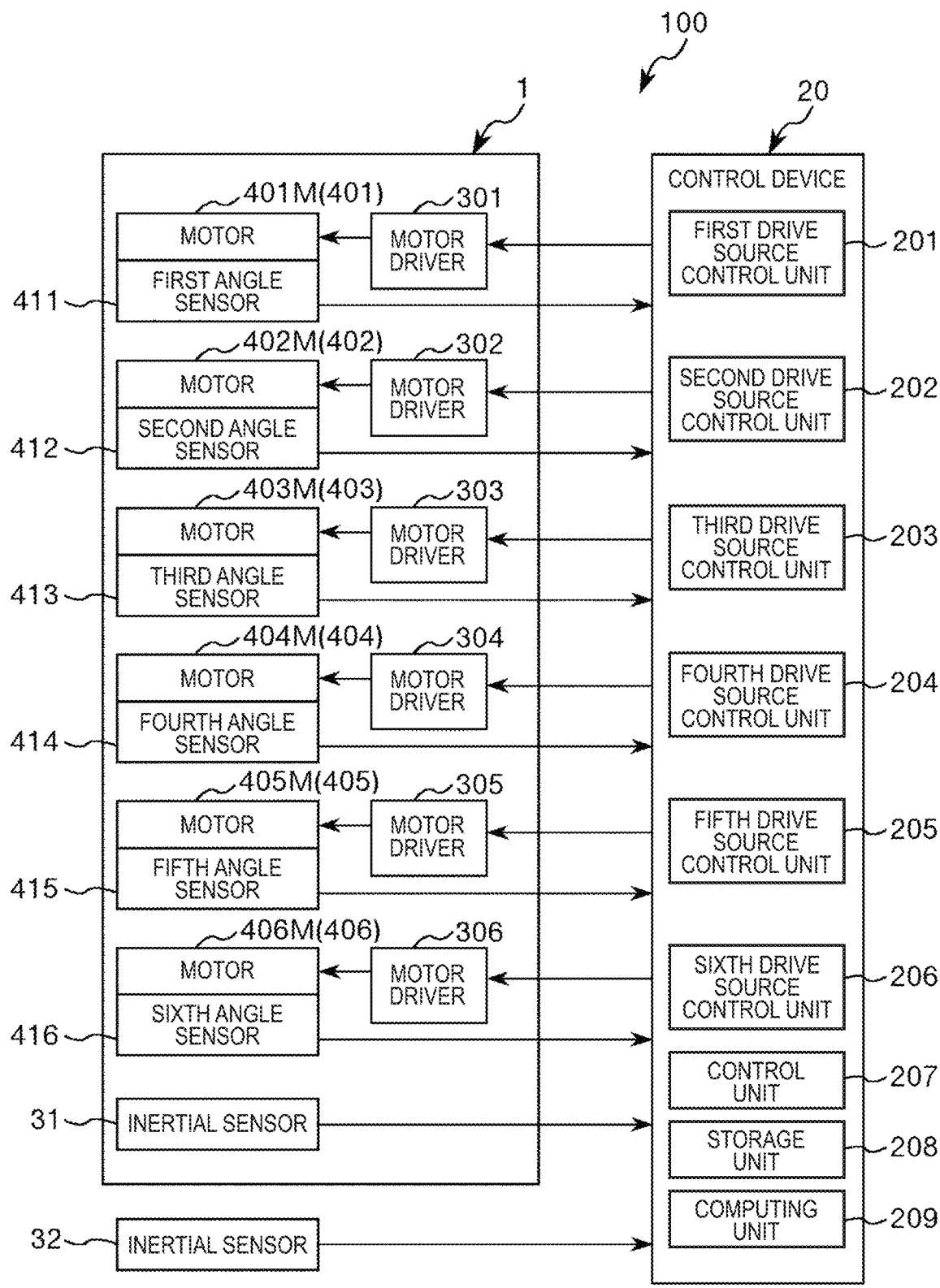
FIG. 3 is a block diagram showing main parts of the control device and the robot controlled by the control device according to the first embodiment of the invention.

FIG. 1 is a perspective view showing a robot controlled by a control device according to a first embodiment of the invention, as viewed from the front. FIG. 2 is a schematic view of the robot shown in FIG. 1. FIG. 3 is a block diagram showing main parts of the control device and the robot controlled by the control device according to the first embodiment.

In the description below, for the sake of convenience of explanation, the upper side in FIGS. 1 and 2 is referred to as "up" or "upper", and the lower side is referred to as "down" or "lower" (the same apples to FIG. 8). The base side in FIGS. 1 and 2 is referred to "proximal end" or "upstream", and the opposite side is referred to as "distal end" or "downstream" (the same applies to FIG. 8). The up-down direction in FIGS. 1 and 2 is the vertical direction (the same applies to FIG. 8).

First, a robot system 100 having a robot 1 as an example of a moving part that is an object for vibration measurement will be described.

The robot system 100 shown in FIGS. 1 to 3 includes the robot 1 and a control device 20 which controls the robot 1. The robot 1 has a base 11 and a manipulator 10 (robot arm). The manipulator 10 has a plurality of arms, in this embodiment, six arms, provided in such a way as to be able to rotate about their respective rotation axes. Although the application of this robot system 100 is not particularly limited, the robot system 100 can be used in the process of manufacturing a precision device such as a wristwatch, for example.

The control device 20 may be partly or entirely arranged inside the robot 1 or may be a separate unit from the robot 1.

The control device 20 can be made up of a PC (personal computer) with a built-in CPU (central processing unit), for example. The control device 20 includes: a first drive source control unit 201 which controls the actuation (driving) of a first drive source 401, described later, of the robot 1; a second drive source control unit 202 which controls the actuation of a second drive source 402; a third drive source control unit 203 which controls the actuation of a third drive source 403; a fourth drive source control unit 204 which controls the actuation of a fourth drive source 404; a fifth drive source control unit 205 which controls the actuation of a fifth drive source 405; a sixth drive source control unit 206 which controls the actuation of a sixth drive source 406; a control unit 207; a storage unit 208 which stores various kinds of information; and a computing unit 209 which carries out various computations, and the like.

The control device 20 also has the function of a vibration measurement device, that is, the function of finding angular velocity (velocity) as an indicator of the magnitude of vibration of a predetermined part of the robot 1, in this embodiment, the manipulator 10, based on an output from an inertial sensor 32. The computing unit 209 of the control device 20 also has the function of finding angular velocity as an indicator of the magnitude of vibration of an arm, based on an output from the inertial sensor 32 provided on the arm, in the state where the arm is resonating. These functions of the control device 20 will be described in detail later. Other indicators of the magnitude of vibration may include displacement (amplitude), acceleration and the like, for example. The control device 20 may find displacement or acceleration of vibration of the manipulator 10, instead of angular velocity as described above. The control device 20 may also find any two of displacement, angular velocity and acceleration, or may find all of displacement, angular velocity and acceleration. Velocity includes angular velocity. Acceleration includes angular acceleration.

The manipulator 10 has a first arm 12, a second arm 13, a third arm 14, a fourth arm 15, a fifth arm 17, a sixth arm 18, the first drive source 401 as a drive unit, the second drive source 402 as a drive unit, the third drive source 403 as a drive unit, the fourth drive source 404 as a drive unit, the fifth drive source 405 as a drive unit, and the sixth drive source 406 as a drive unit. The fifth arm 17 and the sixth arm 18 form a wrist 16. At a distal end part of the sixth arm 18, that is, a distal end surface 163 of the wrist 16, an end effector (no illustrated) such as a hand, for example, can be removably installed. The robot 1 thus can perform various kinds of work such as carrying a precision device, component or the like, by controlling the operations of the arms 12 to 15, the wrist 16 and the like while holding the precision device, component or the like with the hand.

The robot 1 is a vertical multi-joint (6-axis) robot in which the base 11, the first arm 12, the second arm 13, the third arm 14, the fourth arm 15, the fifth arm 17, and the sixth arm 18 are connected in this order from the proximal end side toward the distal end side. Hereinafter, the first arm 12, the second arm 13, the third arm 14, the fourth arm 15, the fifth arm 17, the sixth arm 18, and the wrist 16 are each also referred to as "arm". The first drive source 401, the second drive source 402, the third drive source 403, the fourth drive source 404, the fifth drive source 405, and the sixth drive source 406 are each also referred to as "drive source". The lengths of the arms 12 to 15, 17 and 18 are not particularly limited and can be set according to need.

The base 11 and the first arm 12 are connected together via a joint 171. The first arm 12 is able to rotate about a first rotation axis O1 parallel to the vertical direction, against the base 11. The first rotation axis O1 coincides with a normal line to the upper surface of a floor 101, which is an installation surface for the base 11. The first rotation axis O1 is the most upstream rotation axis of the robot 1. The first arm 12 rotates by being driven by the first drive source 401 having a motor (first motor) 401M and a decelerator (not illustrated). The motor 401M is controlled by the control device 20 via a motor driver 301. The decelerator may be omitted.

The first arm 12 and the second arm 13 are connected together via a joint 172. The second arm 13 is able to rotate about a second rotation axis O2 parallel to the horizontal direction, against the first arm 12. The second rotation axis O2 is orthogonal to the first rotation axis O1. The second arm 13 rotates by being driven by the second drive source 402 having a motor (second motor) 402M and a decelerator (not illustrated). The motor 402M is controlled by the control device 20 via a motor driver 302. The decelerator may be omitted. The second rotation axis O2 may be parallel to an axis orthogonal to the first rotation axis O1.

The second arm 13 and the third arm 14 are connected together via a joint 173. The third arm 14 is able to rotate about a third rotation axis O3 parallel to the horizontal direction, against the second arm 13. The third rotation axis O3 is parallel to the second rotation axis O2. The term "parallel" not only includes the case where the second rotation axis O2 and the third rotation axis O3 are completely parallel to each other but also includes the case where the third rotation axis O3 is tilted within a range of ±5 degrees or less from the second rotation axis O2. The third arm 14 rotates by being driven by the third drive source 403 having a motor (third motor) 403M and a decelerator (not illustrated). The motor 403M is controlled by the control device 20 via a motor driver 303. The decelerator may be omitted.

The third arm 14 and the fourth arm 15 are connected together via a joint 174. The fourth arm 15 is able to rotate about a fourth rotation axis O4 parallel to the direction of the center axis of the third arm 14, against the third arm 14. The fourth rotation axis O4 is orthogonal to the third rotation axis O3. The fourth arm 15 rotates by being driven by the fourth drive source 404 having a motor (fourth motor) 404M and a decelerator (not illustrated). The motor 404M is controlled by the control device 20 via a motor driver 304. The decelerator may be omitted. The fourth rotation axis O4 may be parallel to an axis orthogonal to the third rotation axis O3.

The fourth arm 15 and the fifth arm 17 of the wrist 16 are connected together via a joint 175. The fifth arm 17 is able to rotate about a fifth rotation axis O5 against the fourth arm 15. The fifth rotation axis O5 is orthogonal to the fourth rotation axis O4. The fifth arm 17 rotates by being driven by the fifth drive source 405 having a motor (fifth motor) 405M and a decelerator (not illustrated). The motor 405M is controlled by the control device 20 via a motor driver 305. The decelerator may be omitted. The fifth rotation axis O5 may be parallel to an axis orthogonal to the fourth rotation axis O4.

The fifth arm 17 and the sixth arm 18 of the wrist 16 are connected together via a joint 176. The sixth arm 18 is able to rotate about a sixth rotation axis O6 against the fifth arm 17. The sixth rotation axis O6 is orthogonal to the fifth rotation axis O5. The sixth arm 18 rotates by being driven by the sixth drive source 406 having a motor (sixth motor) 406M and a decelerator (not illustrated). The motor 406M is controlled by the control device 20 via a motor driver 306. The decelerator may be omitted. The sixth rotation axis O6 may be parallel to an axis orthogonal to the fifth rotation axis O5.

The wrist 16 has a wrist main body 161 in a cylindrical shape, as the sixth arm 18, and also has a support ring 162 in a ring-shape which is separate from the wrist main body 161 and provided at a proximal end part of the wrist main body 161, as the fifth arm 17.

In the embodiment, an inertial sensor 31 such as an angular velocity sensor or acceleration sensor is arranged (installed) inside a predetermined arm of the manipulator 10. With this inertial sensor 31, the angular velocity and acceleration of the arm in which the inertial sensor 31 is installed can be detected. Also, the angular velocity can be found, based on an output from the acceleration sensor, that is, based on the result of detection. The number of the inertial sensors 31 is not limited to one but may be plural.

The drive sources 401 to 406 are provided with a first angle sensor 411, a second angle sensor 412, a third angle sensor 413, a fourth angle sensor 414, a fifth angle sensor 415, and a sixth angle sensor 416 in their respective motors or decelerators. These angle sensors are not particularly limited. For example, encoders such as rotary encoders can be used. These angle sensors 411 to 416 detect the angles of rotation of rotation axes of the motors or decelerators of the drive sources 401 to 406, respectively.

The motors of the drive sources 401 to 406 are not particularly limited. However, it is preferable that servo motors such as AC servo motors or DC servo motors are used, for example.

The robot 1 is electrically connected to the control device 20. That is, the drive sources 401 to 406, the angle sensors 411 to 416, and the inertial sensor 31 are each electrically connected to the control device 20.

The control device 20 can actuate the arms 12 to 15 and the wrist 16 separately from each other. That is, the control device 20 can control the drives sources 401 to 406 via the motor drivers 301 to 306 separately from each other. In this case, the control device 20 performs detection with the angle sensors 411 to 416 and the inertial sensor 31 and drives the drive sources 401 to 406, based on the result of the detection, for example, controls the angular velocity, angle of rotation and the like of each arm. This control program is stored in advance in the storage unit 208 of the control device 20.

The control device 20 can also perform vibration control on the manipulator 10 of the robot 1, based on the result of the detection by the inertial sensor 31 and the result of the detection by a predetermined angle sensor, of the angle sensors 411 to 416. Thus, the vibration of the robot 1 (manipulator 10) can be restrained.

In the embodiment, the base 11 is a component situated at the lowest position in the vertical direction of the robot 1 and fixed (installed) on the floor 101 or the like of the installation space. The fixing method for this is not particularly limited. In the embodiment, for example, a fixing method with a plurality of bolts 111 is employed.

In the base 11, for example, the motor 401M and the motor drivers 301 to 306 or the like are accommodated.

Each of the arms 12 to 15 has a hollow arm main body 2, a drive mechanism 3 accommodated in the arm main body 2 and having a motor, and a sealing member 4 which seals the inside of the arm main body 2. In the illustration, the arm main body 2, the drive mechanism 3 and the sealing member 4 of the first arm 12 are also denoted as "2a", "3a" and "4a", respectively. The arm main body 2, the drive mechanism 3 and the sealing member 4 of the second arm 13 are also denoted as "2b", "3b" and "4b", respectively. The arm main body 2, the drive mechanism 3 and the sealing member 4 of the third arm 14 are also denoted as "2c", "3c" and "4c", respectively. The arm main body 2, the drive mechanism 3 and the sealing member 4 of the fourth arm 15 are also denoted as "2d", "3d" and "4d", respectively.

Next, a vibration measurement method for the manipulator 10 of the robot 1 as an example of a moving part will be described.

In the vibration measurement method according to the embodiment, the vibration of the robot 1, that is, the vibration of the manipulator 10, is measured using the inertial sensor 32, which is a first inertial sensor installed in the manipulator 10. This vibration measurement method includes: causing at least one of the first drive source 401 to the sixth drive source 406 as drive units for driving the manipulator 10, to drive the manipulator 10, and causing the inertial sensor 32 to perform measurement in the state where the manipulator 10 is resonating; and finding angular velocity as an indicator of the magnitude of vibration of the manipulator 10, based on an output from the inertial sensor 32. Thus, angular velocity of vibration of the manipulator 10 can be quantitatively measured in the state where the manipulator 10 is resonating.

The site where the inertial sensor 32 is installed is not particularly limited and may be the first arm 12, the second arm 13, the third arm 14, the fourth arm 15, the fifth arm 17, the sixth arm 18 or the like, for example. In the embodiment, the inertial sensor 32 is installed at the distal end of the manipulator 10, that is, at the distal end of the sixth arm 18.

The inertial sensor 32 is not particularly limited and may be a single angular velocity sensor (gyro sensor), a single acceleration sensor, a sensor having a plurality of angular velocity sensors, a sensor having a plurality of acceleration sensors, a sensor having at least one angular velocity sensor and at least one acceleration sensor, or the like, for example. As a sensor having an angular velocity sensor and an acceleration sensor, a 6-axis inertial sensor or the like may be employed, for example. The 6-axis inertial sensor has three angular velocity sensors and three acceleration sensors. The three acceleration sensors detect accelerations in the axial directions of three axes orthogonal to each other. The three angular velocity sensors detect angular velocities about the three axes. If a sensor having an angular velocity sensor is used as the inertial sensor 32, it is advantageous in that the measurement is less susceptible to the influence of gravity and centrifugal force. If a 6-axis inertial sensor is used as the inertial sensor 32, it is advantageous in that a large volume of information can be obtained. It is also advantageous in that the measurement by the angular velocity sensor is less susceptible to the influence of gravity and centrifugal force. The number of the inertial sensors 32 may be one or plural. In the embodiment, an example with only one inertial sensor 32 is employed.

Next, procedures for measuring the vibration of the manipulator 10 of the robot 1 will be described.

Figure 5:
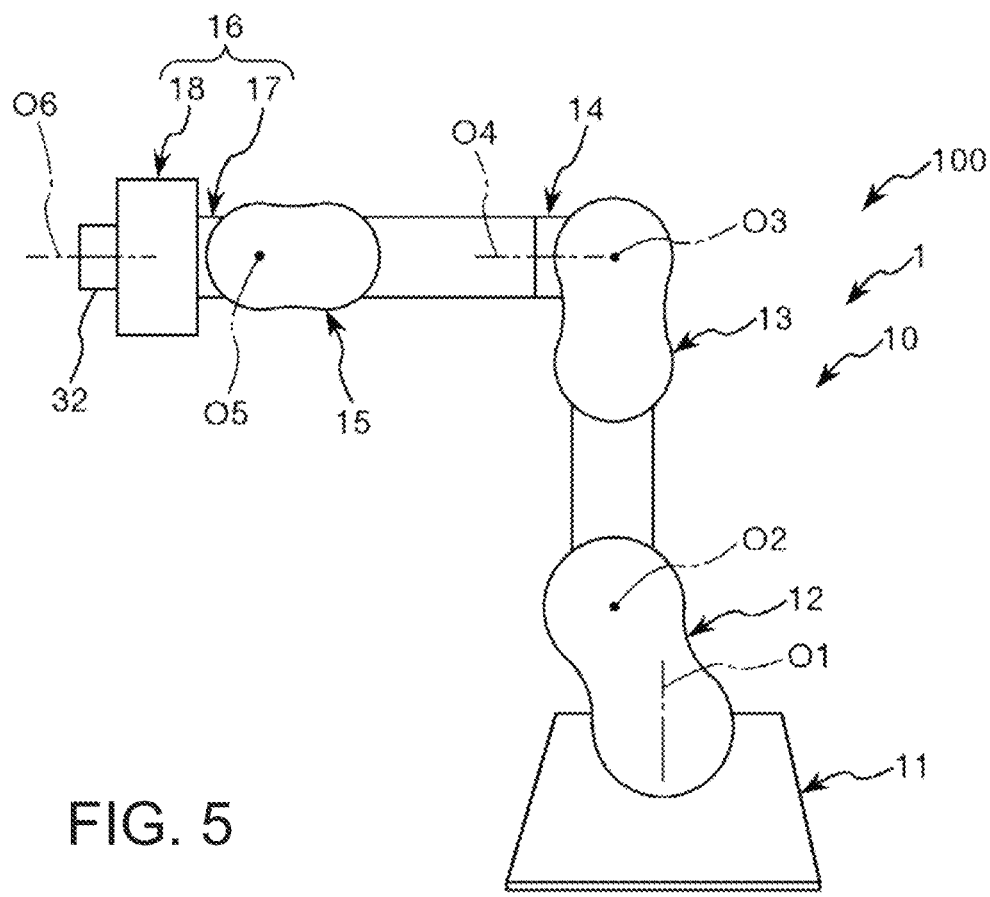
FIG. 5 shows a robot in order to explain a vibration measurement method for a moving part according to a third embodiment of the invention.
Figure 6:
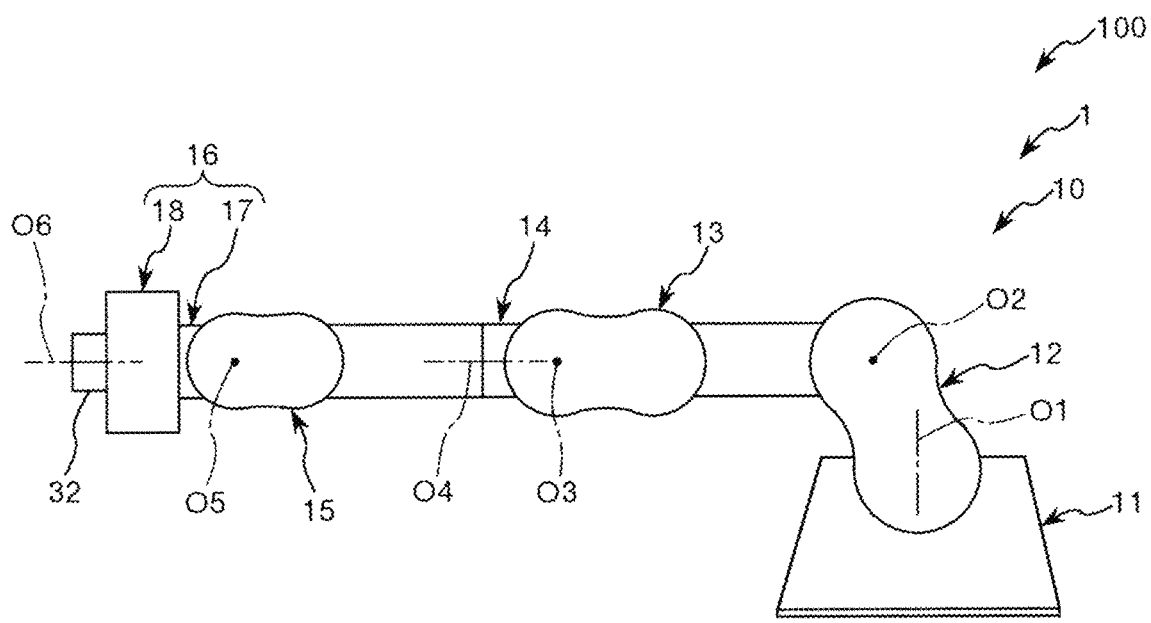
FIG. 6 shows the robot in order to explain the vibration measurement method for the moving part according to the third embodiment of the invention.

[1] The inertial sensor 32 is installed at the distal end of the manipulator 10 of the robot 1 (see FIGS. 5 and 6).

[2] The natural frequency of vibration of the manipulator 10 of the robot 1 is found. To find the natural frequency of vibration, the manipulator 10 is made to vibrate first. For example, the manipulator 10 is struck with a hammer or the like. This causes the manipulator 10 to vibrate. Then, measurement with the inertial sensor 32 is carried out, and the natural frequency of vibration of the manipulator 10 is found, based on the output from the inertial sensor 32, that is, based on the result of detection. If the natural frequency of vibration of the manipulator 10 is already known, this process is omitted.

[3] The measurement by the inertial sensor 32 is carried out.

The manipulator 10 is driven in such a way that the frequency of vibration of the manipulator 10 coincides with the natural frequency of vibration of the manipulator 10.

In this case, any of the first arm 12 to the sixth arm 18 may be made to rotate. For example, the measurement by the inertial sensor 32 is carried out, causing a predetermined arm of the first arm 12 to the sixth arm 18 to rotate, for example. Alternatively, causing a plurality of predetermined arms of the first arm 12 to the sixth arm 18 to rotate in order, the measurement by the inertial sensor 32 is carried out for each of the predetermined arms. As a representative example, the case where the measurement by the inertial sensor 32 is carried out, causing the second arm 13 to rotate, will be described below.

When driving the manipulator 10, the number of rotations of the motor 402M causing the second arm 13 to rotate is adjusted, thereby causing the frequency of vibration of the manipulator 10 to coincide with the natural frequency of vibration of the manipulator 10 and thus causing the manipulator 10 to resonate. Then, in the state where the manipulator 10 is resonating (resonant state), the measurement by the inertial sensor 32 is carried out. In this embodiment and the subsequent embodiments, the angular velocity measured by the inertial sensor 32 is the angular velocity about the sixth rotation axis O6.

If a strain wave gearing device, that is, Harmonic drive (trademark registered), is used as the decelerator of the second drive source 402, the frequency of vibration f of the manipulator 10 is expressed by the following equation (1), where N is the number of rotations of the motor 402M, A is the number of cogs on the wheel on the motor 402M side of the decelerator, and B is the number of cogs on the wheel on the decelerator side of the decelerator. Using this equation (1), the number of rotations of the motor 402 M, when the frequency of vibration of the manipulator 10 coincides with the natural frequency of vibration of the manipulator 10, can be found.

$$f = N \times (A/B) \times 2 \quad (1)$$

[4] Angular velocity as an indicator of the magnitude of vibration is found.

Angular velocity as an indicator of the magnitude of vibration of the manipulator 10 is found, based on the output from the inertial sensor 32, that is, based on the result of detection. The calculation of angular velocity is carried out by the computing unit 209 of the control device 20. In this way, the computing unit 209 has the function of finding angular velocity as an indicator of the magnitude of vibration of the manipulator 10, based on the output from the inertial sensor 32 provided in the manipulator 10, in the state where the manipulator 10 (arm) is resonating.

The acquired information of angular velocity in the resonant state is stored in the storage unit 208 and can be used for various purposes such as the determination on whether the vibration of the robot 1 is acceptable or not, for example.

After the measurement is finished, the inertial sensor 32 is detached. Alternatively, the inertial sensor 32 may be used for other purposes, without being detached.

As described above, in the embodiment, the angular velocity of vibration of the manipulator 10 can be quantitatively measured in the state where the manipulator 10 is resonating.

Thus, the accuracy of the determination on whether the vibration of the robot 1 is acceptable or not can be improved. Also the vibrations of a plurality of robots 1 can be compared quantitatively.

By entering and saving the information of the angular velocity of vibration of the manipulator 10 on a record sheet or the like, it is possible to check the information on the record sheet if a complaint about large vibration or the like of the robot 1 is made by a customer after the delivery of the robot 1, and thus to deal with the complaint. Also, at the stage of shipping subsequent products, it is possible to take measures such as not shipping products with a vibration level equal to or above the vibration level about which the complaint is made. Moreover, whether the robot 1 shows abnormal vibration after shipping or already shows abnormal vibration at the time of manufacturing can be determined.

Here, in this embodiment, vibration measurement is carried out by the inertial sensor 32 dedicated for vibration measurement. However, instead of the inertial sensor 32, the built-in inertial sensor 31 in the manipulator 10 may be used as a first inertial sensor, and the measurement may be carried out using the inertial sensor 31.

Thus, the inertial sensor 31 can be used both for vibration measurement and for vibration control of the robot 1. Therefore, at the time of vibration measurement, the time and effort of attaching and detaching the inertial sensor 32 dedicated for vibration measurement to and from the manipulator 10 can be saved.

Second Embodiment

Figure 4:
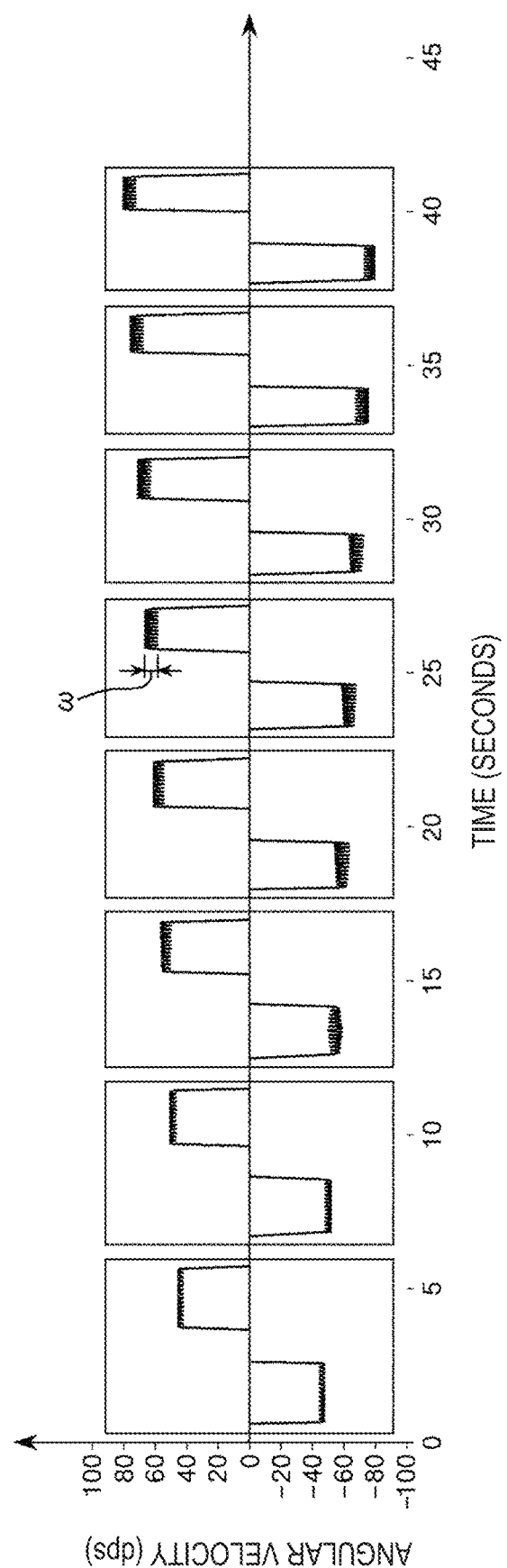
FIG. 4 explains a vibration measurement method for a moving part according to a second embodiment of the invention.

FIG. 4 explains a vibration measurement method for a moving part according to a second embodiment of the invention.

In the second embodiment described below, differences from the foregoing embodiment will be mainly described and similar matters will not be described further in detail. In the second embodiment, as in the first embodiment, the case where measurement is performed, causing the second arm 13 to rotate, is described as a representative example.

In the second embodiment, the manipulator 10 is driven at a plurality of different velocities and measurement is carried out by the inertial sensor 32 at each velocity.

Specifically, in vibration measurement, the motor 402M is driven with a plurality of numbers of rotations, thus causing the second arm 13 to rotate. Then, measurement is carried out by the inertial sensor 32 with each number of rotations. As the plurality of numbers of rotations, a theoretical value at which the frequency of vibration of the manipulator 10 coincides with the natural frequency of vibration of the manipulator 10 and values around this value are set.

Thus, the case where the manipulator 10 has different natural frequencies of vibration due to the individual difference or the like of the robot 1 can be dealt with. That is, the manipulator 10 can be expected to resonate at one of the plurality of numbers of rotations.

FIG. 4 is a graph showing an example of the result of vibration measurement. In this graph, the vertical axis represents the angular velocity measured by the inertial sensor 32, and the horizontal axis represents time.

This measurement is carried out, causing the second arm 13 to rotate forward and backward, that is, to reciprocate. Of the data surrounded by each quadrilateral in FIG. 4, one side is the data, that is, the waveform in the case where the second arm 13 is made to rotate forward, whereas the other side is the waveform in the case where the second arm 13 is made to rotate backward. The data surrounded by each quadrilateral corresponds to each of the plurality of numbers of rotations of the motor 402M. The number of rotations becomes greater as it goes to the right in FIG. 4. The value "ω" in each waveform corresponds to the angular velocity of vibration of the manipulator 10. When this w is at its maximum, the manipulator 10 is resonating.

The second embodiment has similar effects as those of the foregoing embodiment.

Third Embodiment

Figure 7:
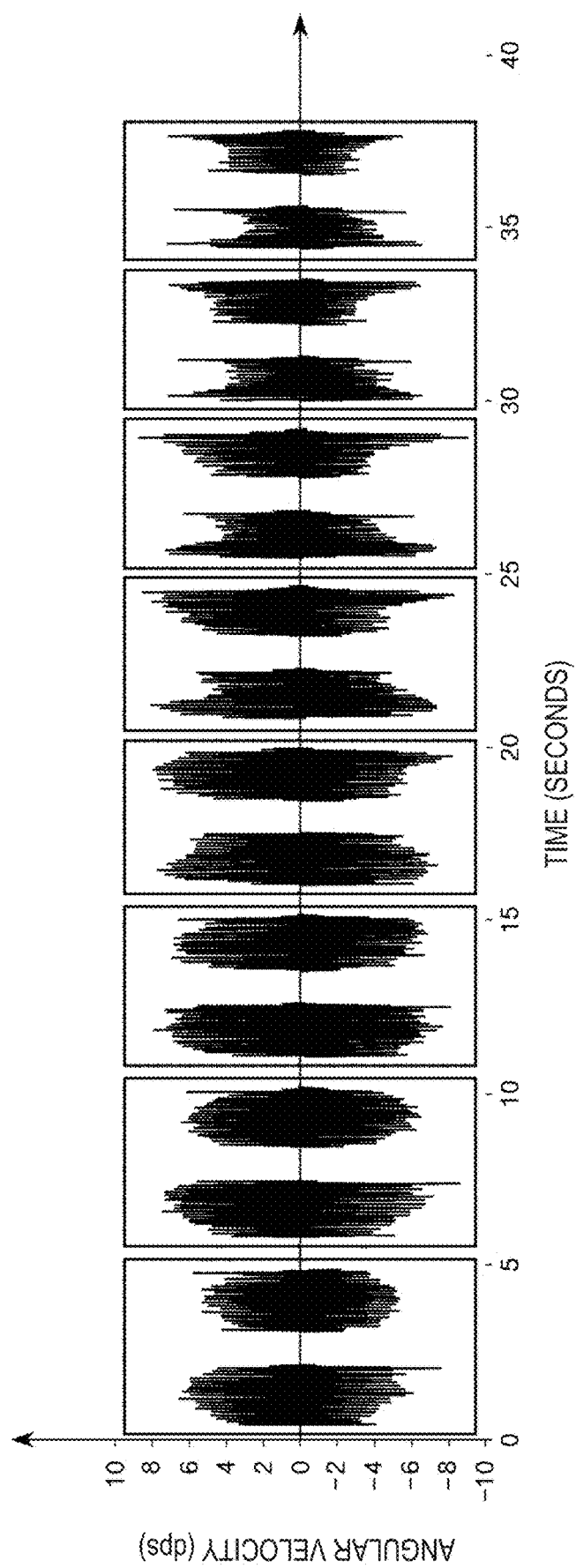
FIG. 7 explains the vibration measurement method for the moving part according to the third embodiment of the invention.

FIGS. 5 and 6 show a robot for explaining a vibration measurement method for a moving part according to a third embodiment of the invention. FIG. 7 explains the vibration measurement method for a moving part according to the third embodiment of the invention.

In the third embodiment described below, differences from the foregoing embodiments will be mainly described and similar matters will not be described further in detail.

In the third embodiment, in vibration measurement, the distal end of the manipulator 10 is moved from a first position to a second position. The distal end of the manipulator 10 is also moved from the second position to the first position. At that time, measurement is carried out by the inertial sensor 32 in the state where at least two arms of the plurality of arms, that is, the first arm 12 to the sixth arm 16, are made to rotate and resonate by at least two of the first drive source 401 to the sixth drive source 406 as the drive units. The rotation axes of the two arms are parallel to each other. While the distal end of the manipulator 10 is moved from the first position to the second position, the distal end of the manipulator 10 is maintained in the same attitude. Also, while the distal end of the manipulator 10 is moved from the second position to the first position, the distal end of the manipulator 10 is maintained in the same attitude. The same attitude not only means completely the same attitude but also includes, if explained in terms of the attitude of the sixth rotation axis O6, for example, the case where the sixth rotation axis O6 during and after the movement of the distal end of the manipulator 10 is tilted within a range of ±5 degrees from the sixth rotation axis O6 before the movement of the distal end of the manipulator 10.

Hereinafter, the case where the distal end of the manipulator 10 is moved, causing the second arm 13 and the third arm 14 to rotate, will be described as a representative example.

First, in this embodiment, in vibration measurement, the second arm 13 and the third arm 14 are made to rotate in different directions from each other, thus changing the attitude of the manipulator 10 from a first attitude shown in FIG. 5 to a second attitude shown in FIG. 6 and moving the distal end of the manipulator 10 from a first position shown in FIG. 5 to a second position shown in FIG. 6. Also, the second arm 13 and the third arm 14 are made to rotate in different directions from each other, that is, in the reverse directions of the foregoing directions, thus changing the attitude of the manipulator 10 from the second attitude shown in FIG. 6 to the first attitude shown in FIG. 5 and moving the distal end of the manipulator 10 from the second position shown in FIG. 6 to the first position shown in FIG. 5. When moving the distal end of the manipulator 10, the numbers of rotations of the motor 402M causing the second arm 13 to rotate and of the motor 403M causing the third arm 14 to rotate are adjusted, thus maintaining the distal end of the manipulator 10 in the same attitude.

FIG. 7 is a graph showing an example of the result of vibration measurement. In the graph, the vertical axis represents the angular velocity measured by the inertial sensor 32, and the horizontal axis represents time.

Of the data surrounded by each quadrilateral in FIG. 7, one side is the data, that is, the waveform in the case where the distal end of the manipulator 10 is moved from the first position shown in FIG. 5 to the second position shown in FIG. 6, whereas the other side is the waveform in the case where the distal end of the manipulator 10 is moved from the second position shown in FIG. 6 to the first position shown in FIG. 5. The data surrounded by each quadrilateral corresponds to each of the plurality of numbers of rotations of the motors 402M and 403M. The number of rotations becomes greater as it goes to the right in FIG. 7.

Here, in this vibration measurement, since the second arm 13 and the third arm 14 are made to rotate, the natural frequency of vibration of the manipulator 10 changes. Therefore, the manipulator 10 can be expected to resonate and the angular velocity of vibration can be measured simultaneously with respect to the operations of the second arm 13 and the third arm 14. Also, since the second rotation axis O2 and the third rotation axis O3 are parallel to each other, the distal end of the manipulator 10 can be maintained in the same attitude. Thus, measurement can be carried out in the state where the target value of the angular velocity of the distal end of the manipulator 10 is 0. Therefore, the angular velocity of vibration of the manipulator 10 can be easily measured quantitatively in the state where the manipulator 10 is resonating.

Specifically, first, in the operation of the manipulator 10 in vibration measurement, the attitude of the manipulator 10 changes and therefore the natural frequency of vibration of the manipulator 10 changes. Thus, it can be expected that, during the operation of the manipulator 10, the frequency of vibration of the manipulator 10 coincides with the natural frequency of vibration of the manipulator 10, thus causing the manipulator 10 to resonate.

Also, in vibration measurement, since the two motors 402M and 403M are driven, the frequency of vibration of the manipulator 10 is decided by a value based on the driving of the motor 402M and a value based on the driving of the motor 403M. Therefore, it can be expected that the frequency of vibration of the manipulator 10 coincides with the natural frequency of vibration of the manipulator 10, thus causing the manipulator 10 to resonate.

Meanwhile, when the attitude of the manipulator 10 changes from the first attitude shown in FIG. 5 to the second attitude shown in FIG. 6, the second arm 13 rotates counterclockwise and the third arm 14 rotates clockwise. When the attitude of the manipulator 10 changes from the second attitude shown in FIG. 6 to the first attitude shown in FIG. 5, the second arm 13 rotates clockwise and the third arm 14 rotates counterclockwise. That is, the second arm 13 and the third arm 14 rotate in different directions from each other. The target value of the angular velocity of the distal end of the manipulator 10 is set to 0, and the distal end of the manipulator 10 is thus maintained in a predetermined attitude.

Thus, as shown in FIG. 7, the angular velocity measured by the inertial sensor 32 is only the angular velocity based on the vibration of the manipulator 10. Therefore, the angular velocity of vibration of the manipulator 10 can be easily found.

In vibration measurement, since combined vibration made up of the vibration of the manipulator 10 due to the vibration of the second arm 13 and the vibration of the manipulator 10 due to the vibration of the third arm 14 is found, the determination on whether the vibration of the robot 1 is acceptable or not can be carried out more quickly than when these vibrations are separately found.

The operation in which the robot 1 changes its attitude from one to the other of the first attitude and the second attitude takes place frequently in the case where the robot carries out work. Therefore, the determination on whether the vibration of the robot 1 is acceptable or not can be carried out according to the actual work.

The third embodiment as described above can achieve effects similar to those of the foregoing embodiments.

Fourth Embodiment

Figure 8:
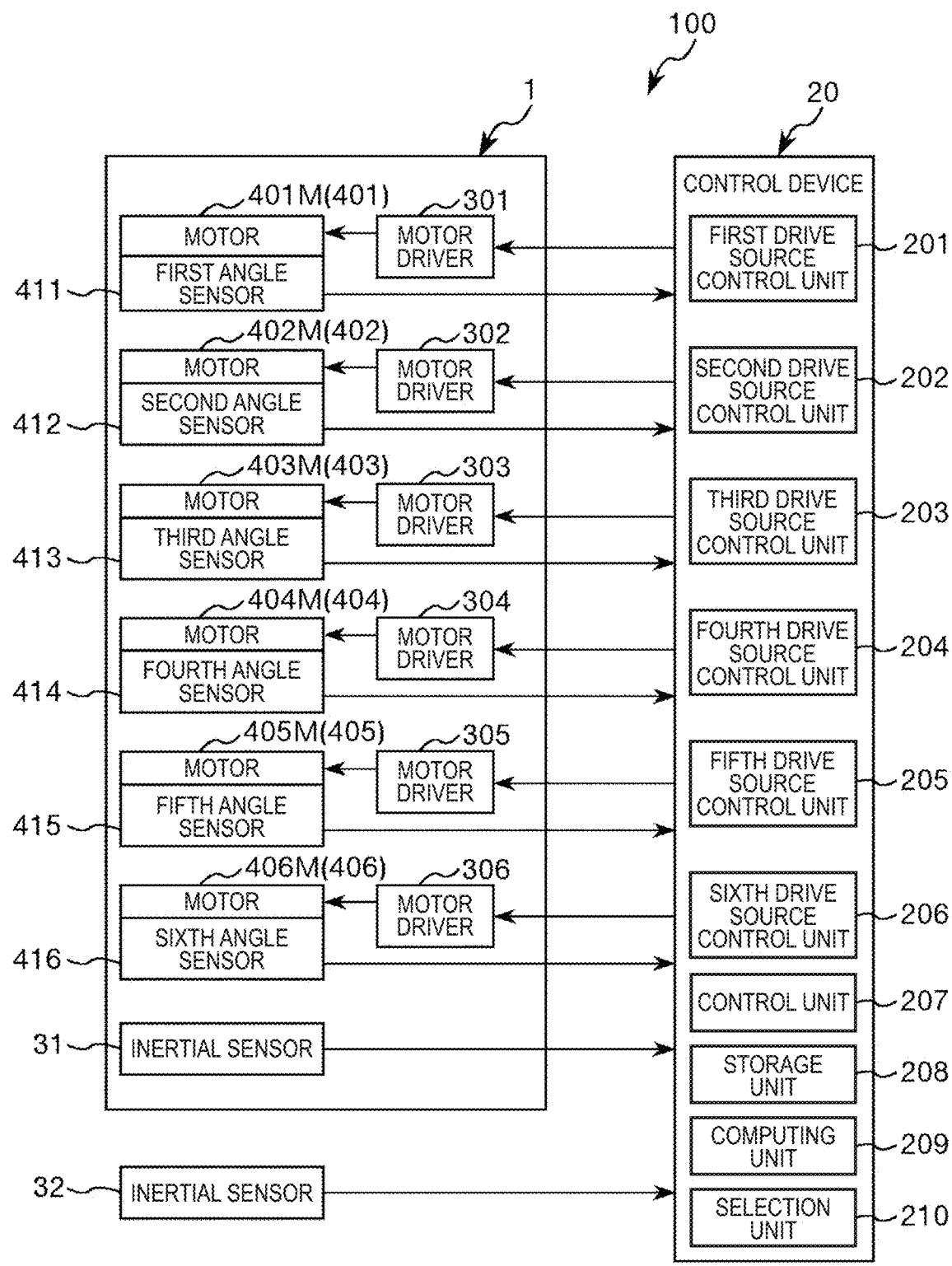
FIG. 8 is a block diagram showing main parts of a control device and a robot controlled by the control device in order to explain a vibration measurement method for a moving part according to a fourth embodiment of the invention.

FIG. 8 is a block diagram showing main parts of a control device and a robot controlled by the control device, for explaining a vibration measurement method for a moving part according to a fourth embodiment of the invention.

In the fourth embodiment described below, differences from the foregoing embodiments will be mainly described and similar matters will not be described further in detail. In the fourth embodiment, too, the case where measurement is carried out, causing the second arm 13 to rotate, will be described as a representative example, as in the first embodiment.

As shown in FIG. 8, in the fourth embodiment, the control device 20 has a selection unit 210 which selects one from a plurality of options.

In vibration measurement, the manipulator 10 is driven at a plurality of different velocities, that is, the second arm 13 as an example of the arm is made to rotate (move) at a plurality of different angular velocities (velocities), and measurement is carried out by the inertial sensor 32 at each angular velocities (velocity).

The selection unit 210 has the function of selecting an angular velocity of the arm corresponding to the lowest angular velocity of vibration, of angular velocities of vibration of the arm found by the computing unit 209 with respective angular velocities when the second arm 13 is made to rotate at a plurality of different angular velocities in vibration measurement. Velocity is a concept including angular velocity. For example, in the operation of the robot, when a moving part of the robot makes a parallel shift, velocity may be employed instead of angular velocity.

Specifically, in vibration measurement, the motor 402M is driven with a plurality of numbers of rotations, thus causing the second arm 13 to rotate. Then, measurement is carried out by the inertial sensor 32 with each number of rotations. As the plurality of numbers of rotations, a theoretical value at which the frequency of vibration of the manipulator 10 coincides with the natural frequency of vibration of the manipulator 10 and values around this value are set.

The selection unit 210 also selects the number of rotations of the motor 402M corresponding to the lowest angular velocity of vibration, of the angular velocities of vibration of the manipulator 10 found by the computing unit 209 with the respective numbers of rotations. The selected number of rotations is set as the number of rotations of the motor 402M at the time of causing the robot 1 to operate. Thus, the vibration of the manipulator 10 can be restrained when causing the robot 1 to operate.

The selection unit 210 may also be configured to select the number of rotations of the motor 402M corresponding to the lowest angular velocity of vibration, of the numbers of rotations equal to or above a threshold provided, instead of simply selecting the number of rotations of the motor 402M corresponding to the lowest angular velocity of vibration. In this case, the operating speed of the robot can be set in view of accuracy requirements and work time or the like.

The fourth embodiment as described above can achieve effects similar to those of the foregoing embodiments.

In vibration measurement, the manipulator 10 may be driven, as in the third embodiment.

Fifth Embodiment

Figure 9:
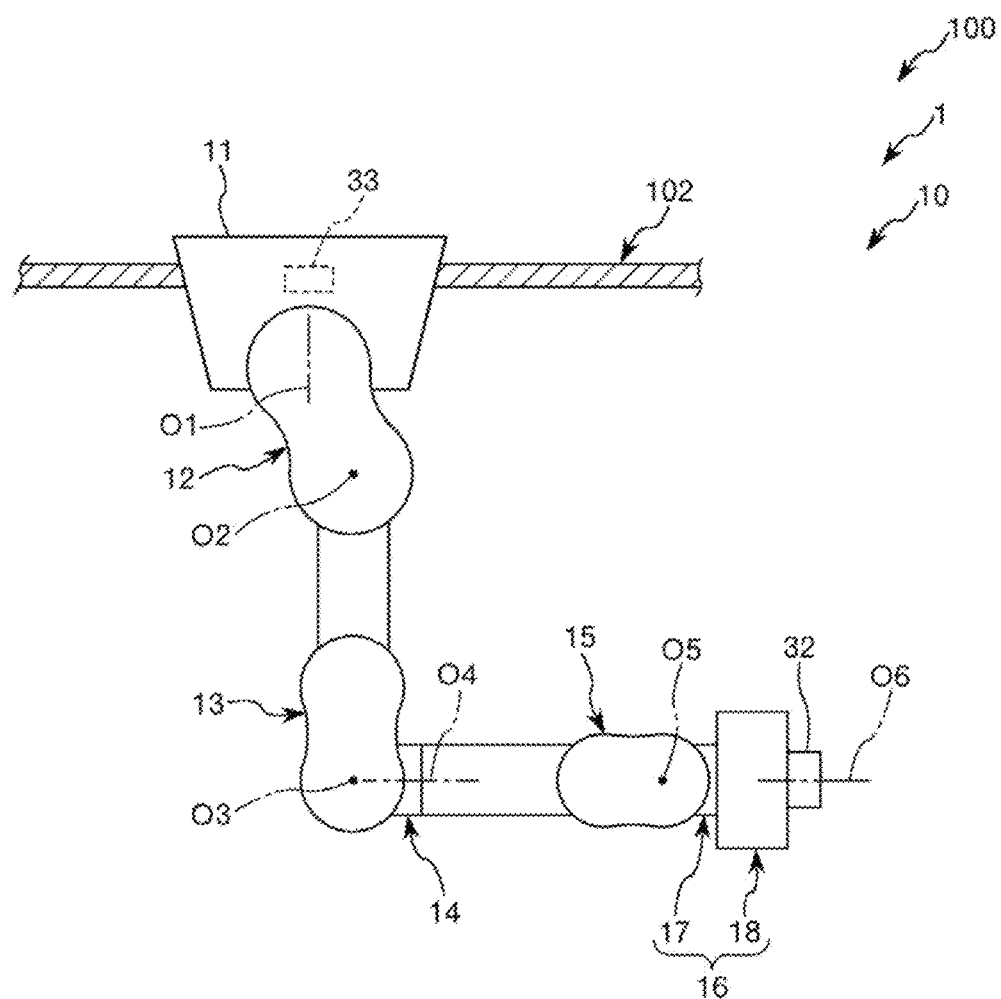
FIG. 9 shows a robot in order to explain a vibration measurement method for a moving part according to a fifth embodiment of the invention.

FIG. 9 shows a robot for explaining a vibration measurement method for a moving part according to a fifth embodiment of the invention.

In the fifth embodiment described below, differences from the foregoing embodiments will be mainly described and similar matters will not be described further in detail. In the fifth embodiment, too, the case where measurement is carried out, causing the second arm 13 to rotate, will be described as a representative example, as in the first embodiment.

As shown in FIG. 9, in the fifth embodiment, the base 11 is situated at the uppermost position in the vertical direction of the robot 1 and fixed to a ceiling 102 of the installation space. As the robot 1 operates, not only the manipulator 10 but also the ceiling 102 vibrates.

In the base 11 as an example of the support part supporting the manipulator 10, an inertial sensor 33 which is a second inertial sensor different from the inertial sensor 32 is provided. This inertial sensor 33 is installed in the base 11 at the time of vibration measurement. The inertial sensor 33 may be removed after the measurement is finished. The inertial sensor 33 may be installed not only in the base 11 but also on the ceiling 102, for example.

Then, in the state where the manipulator 10 is driven by the second drive source 402 as an example of the drive unit, preferably, in the state where the manipulator 10 is resonating, measurement is carried out by the inertial sensor 33 and the angular velocity of vibration of the base 11 is found, based on an output from the inertial sensor 33. The angular velocity of vibration of the base 11 corresponds to the angular velocity of vibration of the ceiling 102. Also, measurement is carried out by the inertial sensor 32 as well, and the vibration of the manipulator 10 is found, based on an output from the inertial sensor 32. The natural frequency of vibration of the ceiling 102 or the like can be found by a method similar to the method of finding the natural frequency of vibration of the manipulator 10 described in the first embodiment.

Thus, the influence of vibration of the robot 1 can be reduced, using a method such as changing not only the operating speed of the robot 1 but also the natural frequency of vibration of the ceiling 102 or the like, for example.

The fifth embodiment as described above can achieve effects similar to those of the foregoing embodiments.

In vibration measurement, the manipulator 10 may be driven as in the third embodiment.

The vibration measurement method for the moving part, the vibration measurement method for the robot and the control device according to the invention have been described, based on the illustrated embodiments. However, the invention is not limited to these embodiments. The configuration of each unit can be replaced with any configuration having similar functions. Also, any other component or process may be added.

The invention may be a combination of any two or more configurations (features) of the respective embodiments.

In the embodiments, the case where the moving part as a subject of vibration measurement is the manipulator of the robot is employed as an example. However, according to the invention, the moving part is not limited to the manipulator of the robot and may be any object capable of moving.

In the embodiments, the site where the base of the robot is fixed is the floor or ceiling of the installation space, for example. However, according to the invention, the site where the base of the robot is fixed is not limited to these examples and may be a wall, work table, ground surface or the like, for example.

According to the invention, the robot may be installed in a cell. In this case, the site where the base of the robot is fixed may be a floor part, ceiling part or wall part of the cell, a work table or the like, for example.

In the embodiments, the first plane, which is the plane (surface) where the robot (base) is fixed, is parallel to the horizontal plane. However, according to the invention, the first plane is not limited to this example, and may be a plane (surface) tilted from the horizontal plane or the vertical plane, or may be a plane (surface) parallel to the vertical plane. That is, the first rotation axis may be tilted from the vertical direction or the horizontal direction, or may be parallel to the horizontal direction.

In the embodiments, the number of rotation axes of the manipulator is six. However, according to the invention, the number of rotation axes of the manipulator is not limited to this example and may be two, three, four, five, or seven or more, for example. That is, while the number of arms (links) is six in the embodiments, the number of arms according to the invention is not limited to this example and may be two, three, four, five, or seven or more. In this case, a robot with seven arms can be realized, for example, by adding an arm between the second arm and the third arm of the robot in the embodiments.

In the embodiments, the number of manipulators is one. However, according to the invention, the number of manipulators is not limited to this example and may be two or more, for example. That is, the robot (robot main body) may be a multiple-arm robot such as a dual-arm robot, for example.

Also, according to the invention, the robot may be in other forms. As a specific example, the robot may be a horizontal multi-joint robot such as a legged walking (running) robot having legs or SCARA robot, for example.

In the embodiments, the control device has the function of measuring the magnitude of vibration. However, according to the invention, this function is not limited to this example and a vibration measurement device which measures the magnitude of vibration may be provided separately from the control device, for example. The vibration measurement device can be made up of a personal computer or the like, for example.

The entire disclosure of Japanese Patent Application No. 2016-090390, filed Apr. 28, 2016, is expressly incorporated by reference herein.

What is claimed is:

1. A method of measuring vibration of a robot by causing a processor to execute a process, the method comprising executing on the processor the steps of:
obtaining a natural frequency of a manipulator of the robot;
adjusting a number of rotations of a motor of the robot to a first number, the motor being configured to drive the manipulator;
after the number of rotations of the motor is set to the first number, driving the manipulator by the first number of rotations of the motor so as to vibrationally resonate the manipulator at the natural frequency;
measuring an angular velocity of the manipulator with a first inertial sensor attached to the manipulator while the manipulator resonates;
storing the measured angular velocity in association of the resonation of the manipulator in a storage of the robot; and
determining whether the vibration of the manipulator is in a predetermined standard according to the measured angular velocity in association of the resonation of the manipulator;
wherein when the processor determines that the vibration of the manipulator is outside of the predetermined standard, the robot is classified as a defective robot.

2. The method according to claim 1, wherein
the manipulator is configured by a plurality of arms including first and second arms, and each arm of the plurality of arms rotates about a corresponding rotation axis, and
when the motor causes a distal end of the manipulator to move from a first position to a second position that are different from each other, the angular velocity is measured by the first inertial sensor while the first and second arms resonate.

3. The method according to claim 2, wherein
the rotation axes of the first and second arms are parallel to each other.

4. The method according to claim 2, wherein
the distal end of the manipulator is maintained at a constant attitude while the motor causes the distal end of the manipulator to move from the first position to the second position.

5. The method according to claim 1, wherein
the motor drives the manipulator at a plurality of different velocities, and
the angular velocity is measured by the first inertial sensor at each of the plurality of different velocities.

6. The method according to claim 1, wherein
the first inertial sensor is installed inside the manipulator.

7. The method according to claim 1, further comprising:
providing a second inertial sensor that is different from the first inertial sensor in a support supporting the motor, and
measuring a vibration value of the support by the second inertial sensor while the motor drives the manipulator.

8. The method according to claim 1, wherein
the first inertial sensor is a 6-axis inertial sensor.

9. The method according to claim 1, wherein
the first inertial sensor is an angular velocity sensor.

10. The method according to claim 2,
wherein the first inertial sensor is installed inside the manipulator.

11. The method according to claim 3,
wherein the first inertial sensor is installed inside the manipulator.

12. The method according to claim 4,
wherein the first inertial sensor is installed inside the manipulator.

13. The method according to claim 5,
wherein the first inertial sensor is installed inside the manipulator.

14. The method according to claim 2,
wherein the first inertial sensor is an angular velocity sensor.

15. The method according to claim 3,
wherein the first inertial sensor is an angular velocity sensor.
16. The method according to claim 4,
wherein the first inertial sensor is an angular velocity sensor.
17. The method according to claim 5,
wherein the first inertial sensor is an angular velocity sensor.
18. The method according to claim 6,
wherein the first inertial sensor is an angular velocity sensor.
19. The method according to claim 7,
wherein the first inertial sensor is an angular velocity sensor.
20. The method according to claim 8,
wherein the first inertial sensor is an angular velocity sensor.

\* \* \* \* \*